United States Patent
Cucchi

(10) Patent No.: US 7,302,877 B2
(45) Date of Patent: Dec. 4, 2007

(54) AUTOMATIC LATHE-LOADER PROVIDED WITH LINEAR SENSORS OF THE POSITION OF THE BAR-PUSHER AND AUTOMATIC LATHE INCLUDING SAID LOADER

(75) Inventor: Pietro Cucchi, Bussero (IT)

(73) Assignee: Pietro Cucchi S.p.A. (IT)

( * ) Notice: Subject to any disclaimer, the term of this patent is extended or adjusted under 35 U.S.C. 154(b) by 0 days.

(21) Appl. No.: 11/223,979

(22) Filed: Sep. 12, 2005

(65) Prior Publication Data

US 2006/0053988 A1    Mar. 16, 2006

(30) Foreign Application Priority Data

Sep. 15, 2004  (IT)  ............... MI2004A1753
Mar. 16, 2005  (IT)  ............... MI2005A0431

(51) Int. Cl.
*B23B 17/00*   (2006.01)

(52) U.S. Cl. ............... 82/124; 82/126; 82/127

(58) Field of Classification Search .......... 82/124, 82/126, 127

See application file for complete search history.

(56) References Cited

U.S. PATENT DOCUMENTS

| | | | | |
|---|---|---|---|---|
| 3,791,564 A | * | 2/1974 | Hugonin | 226/19 |
| 4,573,380 A | * | 3/1986 | Bald | 82/142 |
| 4,914,993 A | * | 4/1990 | Fabbri | 82/127 |
| 5,005,453 A | * | 4/1991 | Rohm | 82/142 |
| 5,303,621 A | * | 4/1994 | Horlitz et al. | 82/1.11 |
| 5,890,407 A | * | 4/1999 | Drei | 82/126 |
| 5,970,830 A | * | 10/1999 | von Niederhausern | 82/127 |
| 2002/0183888 A1 | | 12/2002 | Sasaki et al. | |

FOREIGN PATENT DOCUMENTS

| | | |
|---|---|---|
| EP | 0877307 A | 11/1998 |
| GB | 2168271 A | 6/1986 |
| JP | 11254202 | 12/1999 |

* cited by examiner

*Primary Examiner*—Willmon Fridie, Jr.
(74) *Attorney, Agent, or Firm*—Shlesinger & Fitzsimmons

(57) ABSTRACT

An automatic bar-loader for lathes including a channel for feeding of a bar to the lathe mandrel and a bar-pusher powered by an electric motor controlled by a control unit and having a head collet for grasping the tail of a bar in the channel to make it run therein. The loader includes a sensor for measurement of the axial shifting of the bar-pusher designed for supplying a feedback signal to the control unit for control of the bar-pusher motor.

15 Claims, 2 Drawing Sheets

AUTOMATIC LATHE-LOADER PROVIDED WITH LINEAR SENSORS OF THE POSITION OF THE BAR-PUSHER AND AUTOMATIC LATHE INCLUDING SAID LOADER

BACKGROUND OF THE INVENTION

1. Field of the Invention

This invention relates to an automatic bar-loader for lathes provided with linear sensors of the position of the bar-pusher. More generally this invention relates to an automatic lathe including such a loader.

2. State of the Prior Art

In the case of movable parallel drive-head lathes the lathe mandrel, in addition to starting bar rotation, moves the bar along its axis forward and backward several times during machining of a workpiece. In addition, upon unloading of a machined workpiece, the mandrel returns on the bar with collet open and then, with collet closed, advances the bar the desired amount.

In this manner, the tools only move transversely to the bar. The speed at which the mandrel moves can even be 40 meters per minute with accelerations near 1 g. The loader bar-pusher must obviously follow the mandrel during its sudden shiftings. This tracking must be very precise because otherwise the bar could slip out of the bar-pusher collet or be too compressed with catastrophic consequences for the machining.

In the prior art, synchronization of mandrel and bar-pusher generally takes place through a mechanical connection which however has a very complicated structure and involves considerable costs.

In the case of lathes with fixed parallel lathe drive head, the lathe mandrel starts rotation of the bar which is machined by tools placed on slides which move transversely and longitudinally to the workpiece. The bar is thus moved axially only by the bar-pusher during feeding into the mandrel of the new section to be machined. In other words, when a workpiece has been machined and detached from the bar, the mandrel collet opens and the loader must provide for advancing the bar by the amount desired for machining of the next workpiece. This advancement is generally not done in a very precise manner and the solution adopted in the prior art to remedy this is to position in front of the bar a retainer against which the bar is stopped. But this involves a considerable increase in total time to obtain a workpiece because the retainer must be positioned in front of the bar, often accompanying it in its advance, and then return to the rest position (3 to 8 seconds per workpiece can be lost). In addition, the retainer occupies a place that could be occupied by a machining tool. It is clear that in known loaders, devices and completely different outfitting are necessary to be able to feed a movable or fixed parallel lathe drive head.

The general purpose of this invention is to remedy the above mentioned shortcomings by making available a loader that can easily follow the shifting of the mandrel with greater precision when coupled to a movable parallel lathe drive head.

Another purpose of this invention is to make available a loader that can adapt easily and rapidly to use with a movable or fixed parallel lathe drive head without the need of mechanical bar-retainer devices typical of the prior art.

SUMMARY OF THE INVENTION

In view of these purposes it was sought to provide in accordance with this invention an automatic bar-loader for lathes including a channel for feeding of a bar to the lathe mandrel and a bar-pusher powered by an electric motor controlled by a control unit and having a head collet for grasping the tail of a bar in the channel to make it run therein characterized in that it includes a sensor for measurement of the axial shifting of the bar-pusher designed to supply a feedback signal to control the bar-pusher motor.

DETAILED DESCRIPTION OF THE INVENTION

To clarify the explanation of the innovative principles of this invention and its advantages compared with the prior art there is described below with the aid of the two annexed drawings two possible embodiments thereof by way of non-limiting examples applying said principles.

Figure 1:
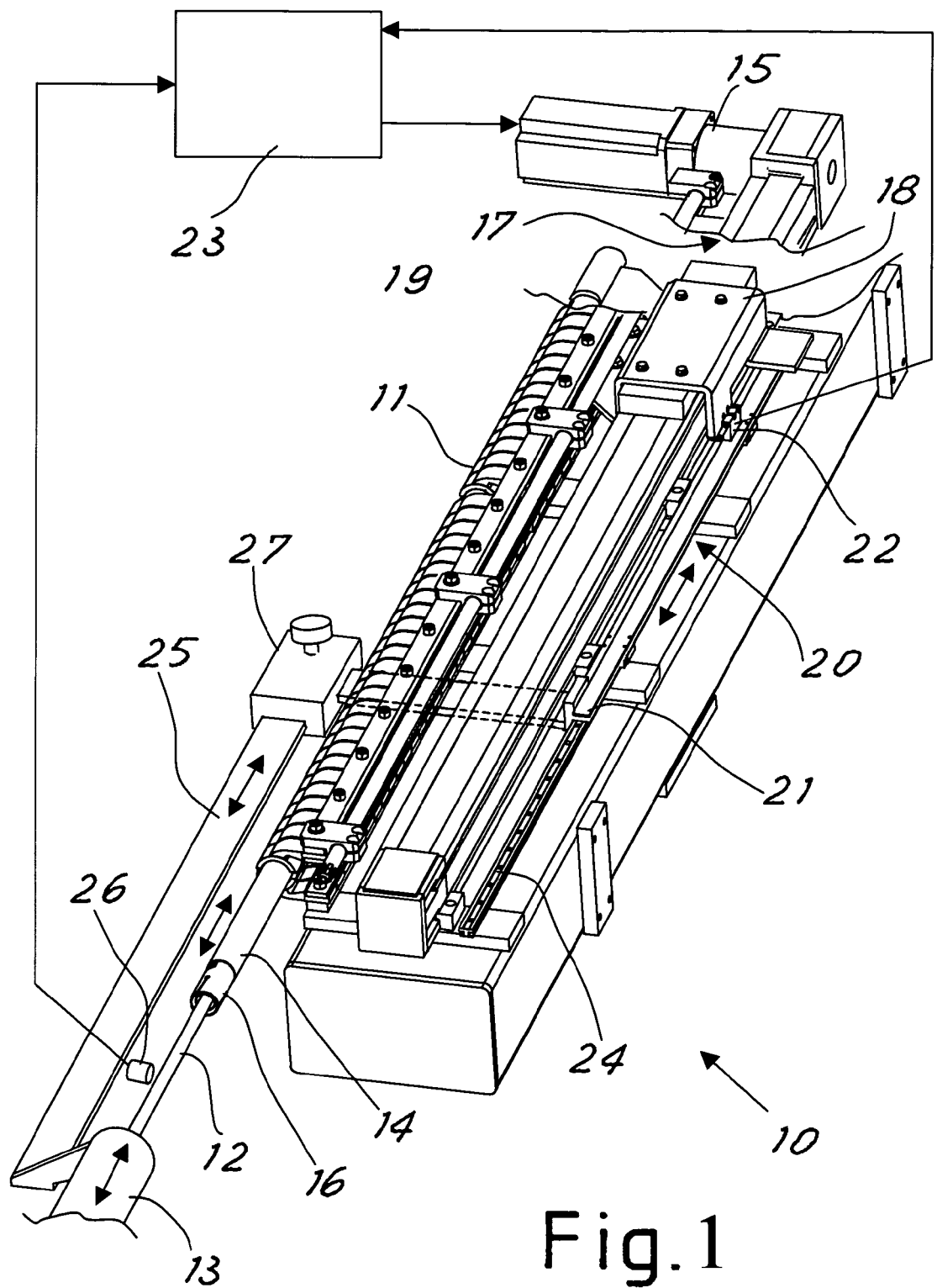
FIG. 1 shows diagrammatically a bar-loader designated as an automatic lathe.

FIG. 1 shows diagrammatically a bar-loader designated as a whole by reference number 10 for a one-mandrel automatic lathe.

The loader includes a channel 11 for feeding a bar 12 to the mandrel 13 of the lathe (not shown being well known to those skilled in the art).

A bar-pusher 14 is powered by an electric motor 15 (for example brushless) and has a head collet 16 for grasping the tail of the bar in the channel and causing it to run therein. In a known manner, the channel 11 can have at least its initial section made up in two halves openable for introduction of the bar by known loading means not shown. As may be seen in the drawing, the two openable halves of the channel can also be advantageously realized with a plurality of members (generally in C form) aligned along their channel axis for elastic support.

Advantageously, the bar-pusher is connected cinematically to the electric motor by means of a linear transmission 17 that runs parallel to the channel 11 to realize a powered linear movement unit. Said unit is as long as the run which the bar-pusher must have and can be made of extruded aluminum with a track on which runs a carriage 18 with recirculating balls. A connector 19 connecting the carriage to the bar-pusher is applied on said car 18. Transmission of motion between the motor and the carriage can include advantageously a toothed-belt transmission.

The loader includes a sensor 20 which includes in turn an appropriate rule 21 parallel to the bar-pusher and a position sensor member 22 that runs along the rule to detect its own position along the rule. Advantageously the rule and the sensor member form a sensor or linear encoder of known type with magnetic rule.

By means of an electronic control unit 23 (known in itself and therefore not described in detail as it is readily imaginable to those skilled in the art) the signal supplied by the sensor 20 which measures the axial movement of the bar-pusher is used as a feedback signal to control the bar-pusher motor with precision.

It must be noted that the mechanical errors of motion transmission to the bar-pusher (given for example by the elasticity of the belt and the play in the reducer) are negligible since the measurement sensor 20 detects directly the position of the bar-pusher downstream of the transmission.

As may be seen in the drawing, the sensor member 22 is connected to move integrally with the bar-pusher while the rule 21 runs along a guide 24 parallel to the bar-pusher channel. This allows adjustment of the axial distance of the rule from the lathe mandrel.

The rule 21 is equipped with means 25 of connection to the lathe mandrel 13 which allow it to hold the distance from the mandrel constant upon axial running of the mandrel. In this manner, the measurement sensor can supply measurement of the relative distance between the mandrel bar-pusher of the lathe whatever the axial position of the mandrel with no need of a separate mandrel position measurement sensor (with the errors and disadvantages that this would involve).

When using the loader with a movable parallel lathe drive head, the rule is rigidly connected to the mandrel and moves therewith. The motor control unit receives a signal from the measurement sensor and commands the motor by feedback to hold constant the relative distance measurement between the bar-pusher and the lathe mandrel when the bar fed is gripped in the lathe mandrel.

In other words, the sensor 22 on the linear module carriage, as soon as it detects a movement of the rule, communicates the information to the control electronics 23 which moves the motor 15 while seeking to cancel the relative rule to sensor movement. Basically, the bar-pusher follows the magnetic rule and hence the mandrel, in a system half-way between the electrical axis and the mechanical connection.

Advantageously, the loader also includes another sensor 26 that detects passage into a predefined position of the leading end of a bar pushed by the bar-pusher along the channel. This sensor 26 thus supplies a zero signal to use the detection of the sensor 20 for measurement of the axial movement of the bar-pusher also as a precise measurement of the axial position of the end of the bar during its axial movement towards and into the mandrel. This allows eliminating the bar end locking system that is necessary in loaders of known type for positioning the end of the bar in the lathe with precision.

If the loader is used with a fixed parallel lathe drive head, it suffices to lock the rule 21 to the loader frame (the connection 25 becomes useless) so that the sensor 22 is a reference for the movements of the bar-pusher with respect to the frame and, consequently, of the bar head (advantageously thanks to the sensor 26 which sets zero).

It is thus possible to ensure precise advancement of the bar (for example with a maximum error of ±0.1 mm) without the use of the prior art retainer and with considerable speed advantages.

Advantageously, means 27 of detachment of the connection 25 and locking of the rule 21 to the frame can be provided. These means can be realized in various ways as easily imaginable to those skilled in the art.

Figure 2:
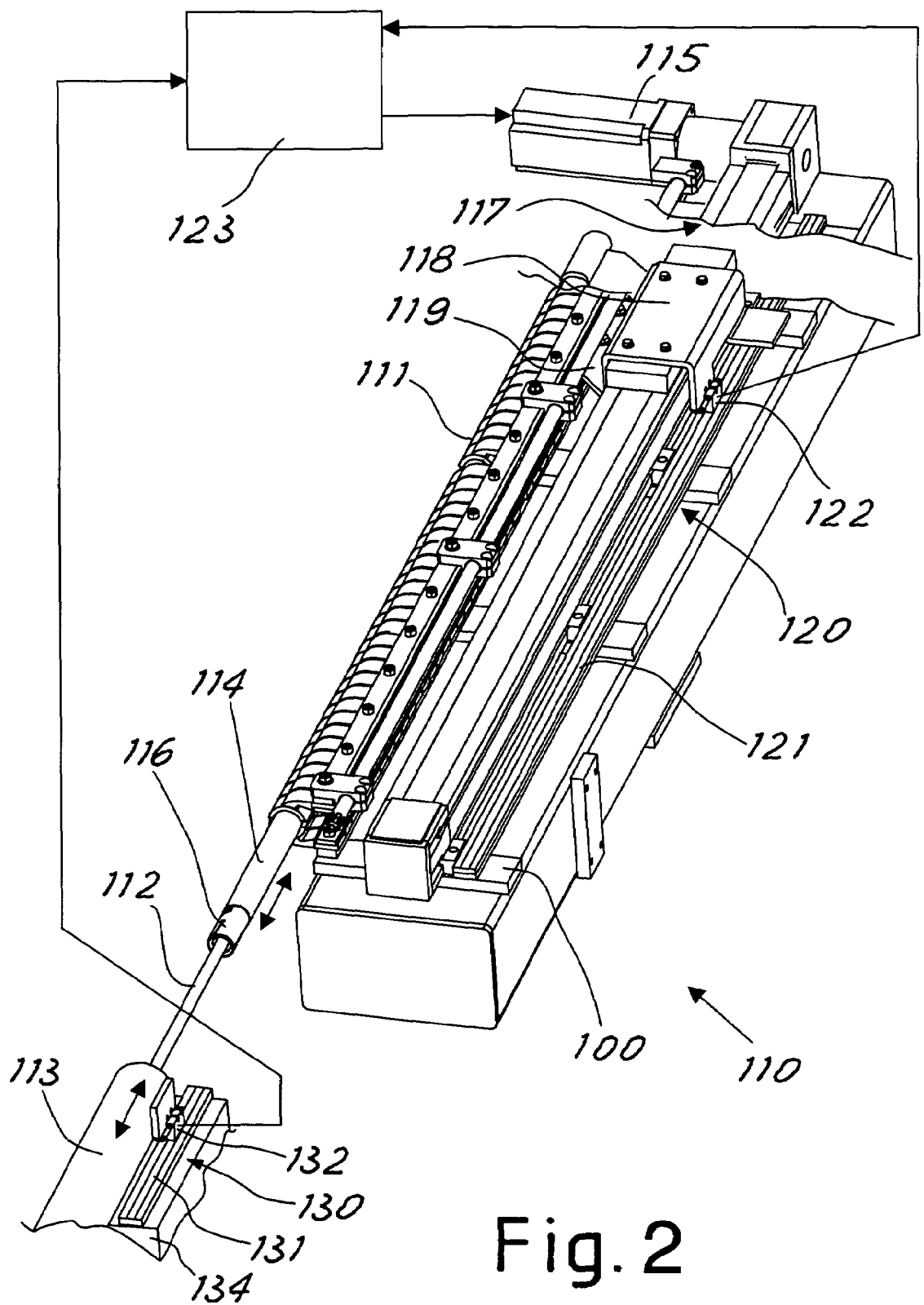
FIG. 2 shows an alternative embodiment of the invention.

FIG. 2 shows an alternative embodiment of the invention.

This figure shows diagrammatically a bar-loader designated as a whole by reference number 110 for a one-mandrel automatic lathe with movable parallel lathe drive head.

The loader includes a channel 111 for feeding a bar 112 to the mandrel 113 of the lathe (not shown being well known to those skilled in the art).

A bar-pusher 114 is powered by an electric motor 115 (for example brushless) and has a head collet 116 for grasping the tail of the bar in the channel and causing it to run therein. In a known manner, the channel 111 can have at least its initial section made up in two halves openable for introduction of the bar by known loading means not shown. As may be seen in the drawing, the two openable halves of the channel can also be advantageously realized with a plurality of members (generally in C form) for elastic support aligned along their channel axis.

Advantageously, the bar-pusher 114 is connected cinematically to the electric motor by means of a linear transmission 117 that runs parallel to the channel 111 to realize a powered linear transport unit. Said unit is as long as the run which the bar-pusher 114 must have and can be made of extruded aluminum with a track on which runs a carriage 118 with recirculating balls. A connector 119 connecting the carriage to the bar-pusher is applied on said carriage 118. Transmission of motion between the motor and the carriage can advantageously include a toothed-belt transmission.

The loader includes a sensor 120 for measurement of the axial shifting of the bar-pusher 114. The sensor 120 includes in turn an appropriate rule 121 parallel to the bar-pusher and a position sensor member 122 that runs along the rule to detect its own position along the rule. Advantageously the rule and the sensor member form a sensor or linear encoder of known type with magnetic rule.

As may be seen in the drawing, the sensor member 122 is connected to move integrally with the bar-pusher while the rule 121 is fastened to the frame 100 of the loader and is as long as the run of the bar-pusher 114. The sensor member 122 is advantageously fastened to the carriage 118.

On the mandrel 113 is arranged a linear sensor 130 for measurement of the axial shifting of the mandrel. The sensor 130, similarly to the sensor 120, includes a rule 131 parallel to the mandrel and a position sensor member 132 that runs along the rule to detect its own position thereon.

The rule 131 extends for the entire run of the mandrel 113 and is constrained to a fixed support 134 of the machine (shown diagrammatically in the figure) while the sensor member 132 is fastened to the mandrel 113 which is movable axially as regards the bar as typically happens in movable parallel lathe drive head lathes. Advantageously the rule 131 and the sensor member 132 make up a sensor or linear encoder of known type with magnetic rule.

The sensor 120 and the sensor 130 supply to the control unit 123 of the motor 115 a signal relative to the positions of the bar-pusher and mandrel. The electronic control unit 123 is known in itself and therefore not described here in detail being easily imaginable to those skilled in the art.

The signal supplied by the sensor 130 is used by the control unit 123 as an input signal since on the basis of the magnitude of said signal the control unit knows the desired position that the bar-pusher must have to hold constant the distance between the mandrel and the bar-pusher with the bar gripped in the mandrel.

The signal supplied by the sensor 120 is used by the control unit 123 as a feedback signal because it allows monitoring of the actual position of the bar-pusher which after all is the variable that is to be controlled.

On the basis of the detections supplied by the sensors 120 and 130, the control unit 123 then generates a signal for precision controlling of the bar-pusher motor so that the latter reproduces the mandrel shifting and the distance between the two members remains always nearly constant during machining with the bar gripped in the mandrel.

Basically, as soon as a shifting of the mandrel 113 is detected by the sensor 130, the control unit 123 commands a suitable shifting of the bar-pusher 114 while controlling the position thereof by using the information supplied by the sensor 120 to have a precise following of the mandrel.

It is noted that the mechanical errors of transmission of motion to the bar-pusher (given for example by the elasticity of the belt and the play in the reducer) are negligible sine the measurement sensor 120 directly detects the position of the bar-pusher downstream of the transmission.

It is now clear that the preset purposes have been achieved by making available a loader allowing precise following of the mandrel shifting in case of lathes with movable parallel lathe drive head while avoiding having to use complicated and costly mechanical connection systems.

Clearly, with a loader in accordance with the first embodiment it is possible to construct a basic structure that remains always the same for use with either fixed or movable parallel lathe drive head with changing parallel lathe drive head type, it sufficing to connect or not connect the magnetic rule to the lathe mandrel and set the control unit accordingly.

Naturally the above description of an embodiment applying the innovative principles of this invention is given by way of non-limiting example of said principles within the scope of the exclusive right claimed here.

For example, the linear transmission 117 could include a worm screw with recirculating balls or other axial shifting systems in place of the toothed belt. The loader could also include all the systems and devices known for this type of device, for example for loading of the new bar and unloading the remaining bar piece from the collet.

Even the type of sensor used need not be with magnetic rule as described above but could be any linear shifting measurement system as for example with wire or other type of encoder.

What is claimed is:

1. An automatic bar-loader for lathes including:
   a channel through which a bar can be fed to a lathe mandrel;
   an electric motor;
   a bar-pusher powered by the electric motor;
   a control unit connected to at least one of the electric motor and the bar pusher;
   the bar-pusher comprising a head collet that can grasp a tail of a bar in the channel, thereby moving the bar in the channel; and
   at least one of the bar-pusher and the head collet thereof including a sensor that can measure axial shifting of the bar-pusher and that can supply a feedback signal to the control unit to control the bar-pusher motor, the sensor including a rule parallel to the bar-pusher and a position sensor member running along the rule to detect a position of the bar-pusher along the rule, the sensor member being connected to move integrally with the bar-pusher and the rule running along a guide parallel to the bar-pusher channel.

2. A loader in accordance with claim 1 characterized in that the rule is equipped with means of connection to the lathe mandrel to move the rule with axial running of the mandrel.

3. A loader in accordance with claim 1 characterized in that the rule is equipped with means for selectively allowing at least one of movement of the rule with the lathe mandrel and locking the rule against movement with the lather mandrel.

4. An automatic bar-loader for lathes including:
   a channel through which a bar can be fed to a lathe mandrel;
   an electric motor;
   a bar-pusher powered by the electric motor;
   a control unit connected to at least one of the electric motor and the bar pusher;
   the bar-pusher comprising a head collet that can grasp a tail of a bar in the channel, thereby moving the bar in the channel; and
   at least one of the bar-pusher and the head collet thereof including a sensor that can measure axial shifting of the bar-pusher and that can supply a feedback signal to the control unit to control the bar-pusher motor, the sensor including a rule parallel to the bar-pusher and a position sensor member running along the rule to detect a position of the bar-pusher along the rule, the rule of the sensor for measurement of the axial shifting of the bar-pusher being integral with a fixed frame of the machine, the corresponding sensor member being integral with the bar-pusher.

5. A loader in accordance with claim 1 characterized in that the loader includes a sensor for measurement of axial shifting of the mandrel, the sensor supplying an input signal to the control unit of the motor.

6. A loader in accordance with claim 5 characterized in that the sensor for measurement of the axial shifting of the mandrel includes a rule parallel to the bar-pusher and a position sensor member running along the rule to detect position of the mandrel along the rule.

7. An automatic bar-loader for lathes including:
   a channel through which a bar can be fed to a lathe mandrel;
   an electric motor;
   a bar-pusher powered by the electric motor;
   a control unit connected to at least one of the electric motor and the bar pusher;
   the bar-pusher comprising a head collet that can grasp a tail of a bar in the channel, thereby moving the bar in the channel; and
   at least one of the bar-pusher and the head collet thereof including a sensor that can measure axial shifting of the bar-pusher and that can supply a feedback signal to the control unit to control the bar-pusher motor, the loader including a sensor for measurement of axial shifting of the mandrel, the sensor supplying an input signal to the control unit of the motor, the sensor including a rule parallel to the bar-pusher and a position sensor member running along the rule to detect position of the mandrel along the rule, the rule of the sensor for measurement of the axial shifting of the mandrel being integral with a fixed frame of the machine, the corresponding sensor member being integral with the mandrel.

8. A loader in accordance with claim 7 characterized in that the rule and the corresponding sensor member comprise a magnetic rule type linear sensor.

9. A loader in accordance with claim 1 characterized in that depending on the signals received from said sensor the control unit commands the motor to follow the shifting of the lathe mandrel with the bar-pusher when the bar fed is gripped in the lathe mandrel.

10. A loader in accordance with claim 1 characterized in that the bar-pusher is connected kinematically to the electric motor by a linear transmission running parallel to the channel.

11. A loader in accordance with claim 1 further comprising another sensor that detects passage into a predefined position of a head end of a bar pushed by the bar-pusher along the channel, the another sensor supplies a zero signal to use the bar-pusher axial movement measurement sensor as a measurement of the axial position of said bar end during its axial movement.

12. An automatic bar-loader for lathes including:

a channel through which a bar can be fed to a lathe mandrel;

an electric motor;

a bar-pusher powered by the electric motor and connected kinematically to the electric motor by a linear transmission running parallel to the channel, the linear transmission including a toothed belt;

a control unit connected to at least one of the electric motor and the bar pusher;

the bar-pusher comprising a head collet that can grasp a tail of a bar in the channel, thereby moving the bar in the channel; and at least one of the bar-pusher and the head collet thereof including a sensor that can measure axial shifting of the bar-pusher and that can supply a feedback signal to the control unit to control the bar-pusher motor.

13. A loader in accordance with claim 12 characterized in that the sensor for measurement of the axial shifting of the bar-pusher includes a rule parallel to the bar-pusher and a position sensor member running along the rule to detect a position of the bar-pusher along the rule.

14. A loader in accordance with claim 13 characterized in that the sensor member is connected to move integrally with the bar-pusher and the rule runs along a guide parallel to the bar-pusher channel.

15. A loader in accordance with claim 4 characterized in that depending on the signals received from said sensor the control unit commands the motor to follow the shifting of the lathe mandrel with the bar-pusher when the bar fed is gripped in the lathe mandrel.

* * * * *